(12) United States Patent
Tapia

(10) Patent No.: US 9,666,096 B2
(45) Date of Patent: May 30, 2017

(54) TACTILE SPELLING TOTEMS

(71) Applicant: Laresa Tapia, Longwood, FL (US)

(72) Inventor: Laresa Tapia, Longwood, FL (US)

( * ) Notice: Subject to any disclaimer, the term of this patent is extended or adjusted under 35 U.S.C. 154(b) by 193 days.

(21) Appl. No.: 14/733,420

(22) Filed: Jun. 8, 2015

(65) Prior Publication Data

US 2016/0358499 A1 Dec. 8, 2016

(51) Int. Cl.
| G09B 1/00 | (2006.01) |
|---|---|
| G09B 17/00 | (2006.01) |
| G09B 1/02 | (2006.01) |
| G09B 1/16 | (2006.01) |

(52) U.S. Cl.
CPC ............... *G09B 17/00* (2013.01); *G09B 1/02* (2013.01); *G09B 1/16* (2013.01)

(58) Field of Classification Search
USPC ....... 434/156, 157, 159, 161, 167, 170, 171, 434/172, 174, 176, 207, 402, 403
See application file for complete search history.

(56) References Cited

U.S. PATENT DOCUMENTS

| 1,403,196 A | | 1/1922 | Rasely | |
|---|---|---|---|---|
| 3,654,712 A | * | 4/1972 | Bagdasar | G09B 17/00 273/296 |
| 3,903,617 A | * | 9/1975 | Evans | G09B 17/00 434/171 |
| 4,345,902 A | * | 8/1982 | Hengel | G09B 17/00 434/170 |
| 4,636,172 A | * | 1/1987 | Fredericks | G09B 17/00 434/159 |
| 4,667,962 A | | 5/1987 | Ishiyama | |
| 4,846,687 A | * | 7/1989 | White | G09B 21/009 434/112 |
| 5,092,777 A | * | 3/1992 | Crowe | G09B 1/32 434/129 |
| 5,152,690 A | * | 10/1992 | Todd | G09B 21/003 434/112 |
| 5,275,567 A | * | 1/1994 | Whitfield | G09B 21/003 434/112 |
| 5,417,432 A | * | 5/1995 | Dwyer | A63F 1/02 273/299 |
| 5,480,308 A | * | 1/1996 | Boundy | G09B 23/38 434/296 |
| 5,554,062 A | | 9/1996 | Goldsen | |
| 5,788,503 A | * | 8/1998 | Shapiro | G09B 1/00 434/167 |
| 5,906,492 A | * | 5/1999 | Putterman | G09B 17/006 273/299 |

(Continued)

*Primary Examiner* — Kurt Fernstrom
(74) *Attorney, Agent, or Firm* — Jason T. Daniel, Esq.; Daniel Law Offices, P.A.

(57) ABSTRACT

A spelling totem includes a generally rectangular box-shaped member having a plurality of side surfaces. Each of the side surfaces are directed towards a different letter of the alphabet and further include various implementations of the letter. The implementations can include any combination of an upper case letter, a lower case letter, a word that begins with the letter, an image of the word, the braille representation of the letter, the sign language representation of the letter, and a number showing where the particular letter falls in the alphabet. A set of individual spelling totems includes each letter of the alphabet, and each totem is designed to be aligned so as to spell various words.

19 Claims, 7 Drawing Sheets

(56) References Cited

U.S. PATENT DOCUMENTS

| | | | |
|---|---|---|---|
| 6,685,477 B1 * | 2/2004 | Goldman | G09B 17/00 434/172 |
| 6,739,875 B1 * | 5/2004 | Lin | G09B 19/02 434/188 |
| 6,869,286 B2 * | 3/2005 | Furry | G09B 19/04 434/156 |
| 7,011,525 B2 * | 3/2006 | Mejia | G09B 19/04 434/167 |
| D590,442 S * | 4/2009 | Jones | D19/59 |
| 7,614,881 B2 | 11/2009 | Bagues | |
| 2013/0189653 A1 * | 7/2013 | Milne | G09B 19/00 434/159 |
| 2013/0302763 A1 * | 11/2013 | Edwards | G09B 1/36 434/159 |

* cited by examiner

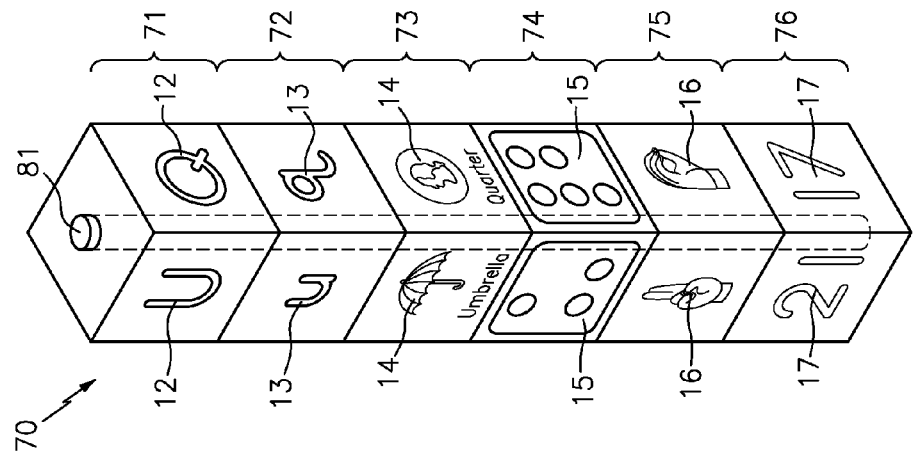
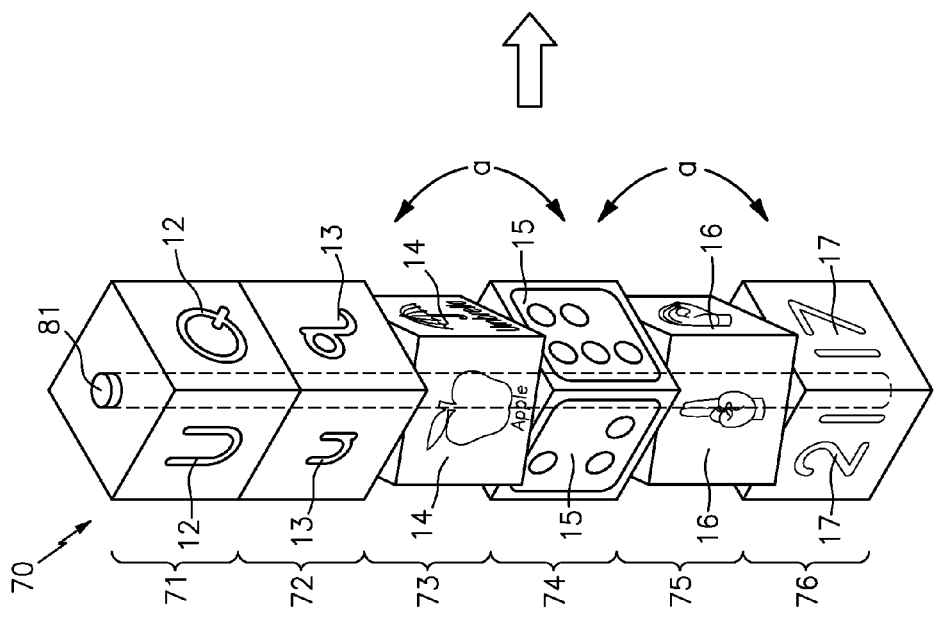

TACTILE SPELLING TOTEMS

TECHNICAL FIELD

The present invention relates generally to learning tools, and more particularly to a new series of educational totem blocks to aid children in learning letters and spelling.

BACKGROUND

The statements in this section merely provide background information related to the present disclosure and may not constitute prior art.

One of the most effective methods for teaching children the basics of reading, writing, and/or mathematics, is through physical contact with associated items. This method of learning is often referred to as kinesthetic learning, wherein children develop basic skills such as sorting letters and objects based upon size, color, shape, etc., or matching similar objects together. These basic skills provide a foundation upon which children can begin to associate letters with words, and numbers with respective quantities of objects, for example. From there, children may then progress to the more advanced skills of reading, writing, and the use of mathematics.

In addition to learning these concepts in the child's primary language, there is great emphasis in teaching children to communicate with others via secondary communication methodologies such as braille and/or sign language, for example. In this regard, there are several known devices such as flash cards and building blocks, for example, which are used to teach children various skills However, these devices are typically directed toward single learning aspect such as letters in English, or Braille, or sign language. As such, the current teaching strategies teach interrelated concepts utilizing different mechanisms, which do not allow children to learn the concepts together.

Based on the foregoing, there is a clear need for an educational device which can teach children the basics of letters and spelling across multiple communication platforms, while facilitating tactile learning. It would also be beneficial if the device were embodied in one or more building blocks/totems which can encourage a hands-on playing environment for children.

SUMMARY OF THE INVENTION

The present invention is directed to a tactile spelling totem for teaching children the basics of letters and words using various communication mediums.

One embodiment of the present invention can include a generally rectangular box-shaped member having a plurality of side surfaces which are directed towards a different letter of the alphabet and include various implementations of the letter. For example, the implementations can include any combination of an upper case letter, a lower case letter, a word that begins with the letter, an image of the word, the braille representation of the letter, the sign language representation of the letter, and/or a number showing where the particular letter falls in the alphabet.

Another embodiment of the present invention can include a raised or lowered surface area, along with various different colors, materials and/or texturing in order to facilitate tactile learning of the various implementations.

Yet another embodiment of the present invention can include a set of spelling totems that include each letter of the alphabet, and that are designed to be aligned so as to spell various words. Another embodiment of the present invention can include the ability for each totem block to independently rotate about a central axis.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 8 is a perspective view of a spelling totem, in accordance with an alternate embodiment of the invention.

FIG. 9 is another perspective view of the spelling totem of FIG. 8, in accordance with the alternate embodiment of the invention.

DETAILED DESCRIPTION OF THE INVENTION

Figure 1:
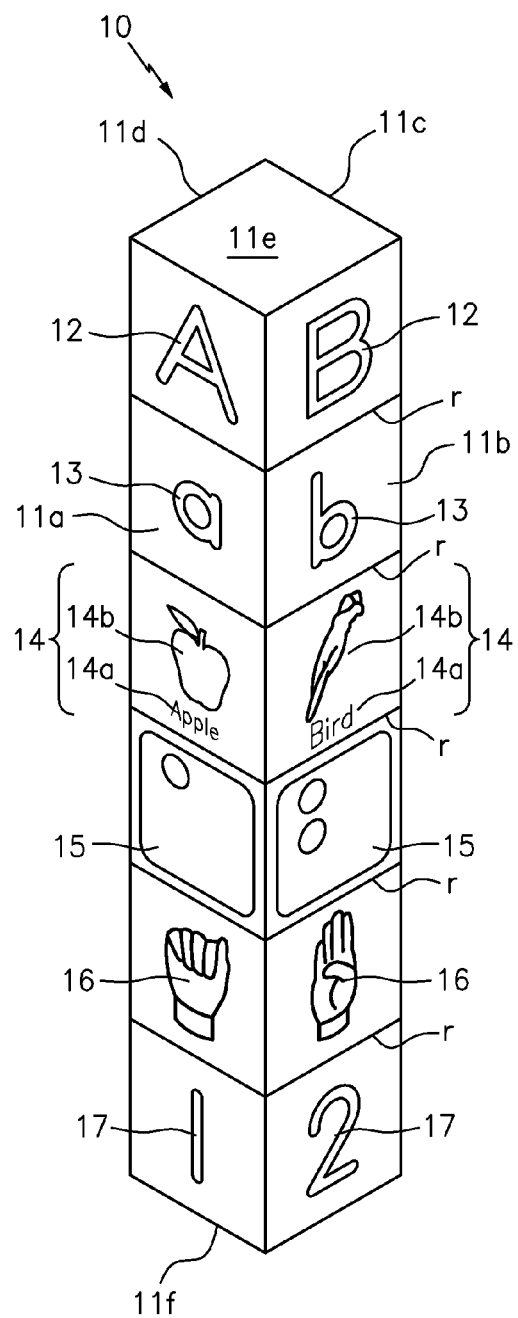
FIG. 1 is a perspective view of a spelling totem that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Although described and illustrated with respect to the modern English alphabet, American Sign Language (ASL)

and Braille, this is for illustrative purposes only, as any number of different communication languages can be used in conjunction with, or in place of these languages. As such, the inventive concepts disclosed herein are not to be construed as limiting to any particular number of devices, alphabet, language or number system.

FIGS. 1-7 illustrate various embodiments of a tactile spelling totem 10 for teaching letters and spelling across a plurality of communication methodologies that is useful for understanding the inventive concepts disclosed herein.

Figure 2:
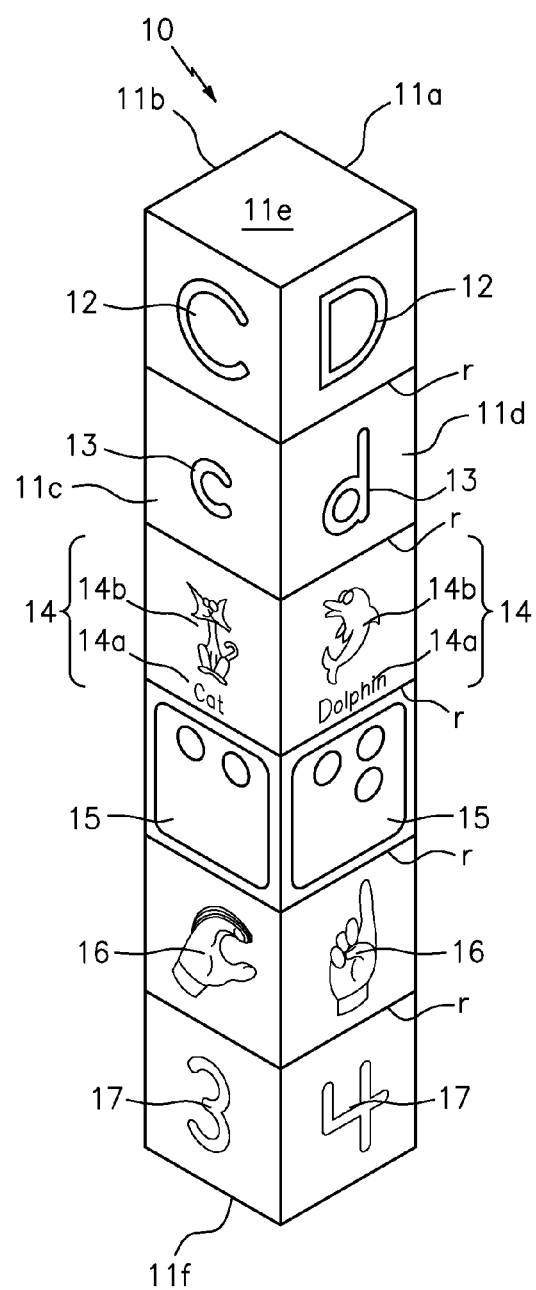
FIG. 2 is another perspective view of the spelling totem of FIG. 1, in accordance with one embodiment of the invention.

FIGS. 1 and 2 illustrate two perspective views of a single totem 10 that includes an elongated, generally rectangular box-shaped member having a first side surface 11a, a second side surface 11b, a third side surface 11c, a fourth side surface 11d, a top end 11e and a bottom end 11f. As shown, each totem 10 includes a plurality of horizontal ridges r that extend across each of the side surfaces 11a-11d, so as to provide the appearance that the totem is a series of individual building blocks that are stacked together vertically. Such a feature causes the totems to be immediately recognizable to children, and encourages the child to handle and play with the totem.

In one embodiment, each side surface 11a, 11b, 11c and 11d can be directed towards a single letter language family that consists of a particular letter 12, and several different implementations of the letter, such as the same letter in lower case 13, a word 14a that begins with the letter, and an image 14b of the word (referred to collectively as 14), the braille representation of the letter 15, the sign language representation of the letter 16, and a number 17 showing where the particular letter falls in the alphabet. Of course, elements 12-17 can be arranged in any number of different combinations, and other embodiments containing some but not all of the elements 12-17, are also contemplated.

The totem 10 can be constructed from a lightweight sturdy material such as wood or plastic, for example; however other construction materials such as foam and/or rubber are also contemplated so as to enable stacking of multiple totems together, as is known in the art. Moreover, as many children learn best through tactile interactions, it is preferred that each element 12-17 be provided in either a raised or recessed manner, thereby providing a three dimensional effect that can assist children to trace the shapes with their fingers.

Alternatively or in addition, one or more elements of the letter language family 12-17 of the totem 10 may include various different colors, scents, construction materials and/or texturing. For example, each vowel (See FIG. 3) can include a color 30 that is different from the color of the consonants Likewise, various letters which are commonly grouped together in words, such as Q and U, for example, can also be provided with unique and/or identical colors or texturing/surface materials 40 that are different from the colors and/or texture and/or materials of other letters and/or letter combinations.

As described herein, different texturing can include a situation wherein one or more elements 12-17 are constructed from, or coated with a secondary material (such as rubber, felt, or foam, for example), in order to allow a child to see and/or feel the difference between a textured and non-textured element. Such a feature is particularly beneficial for kinesthetic learners wherein the physical differences can be retained through touch and sight.

In either instance, the totem 10 can be provided in various sizes so as to allow children of all ages and learning levels to easily play with the totem, and to see and feel each of the elements 12-17. Such a feature advantageously helps small children to develop muscle coordination, touch sensitivity, and visual recognition. Of course, those of skill in the art will recognize that changes of appearance, composition, and/or structure of the totem 10 are within the scope of the invention, and that the same is not limited to the illustrated embodiments.

Figure 3:
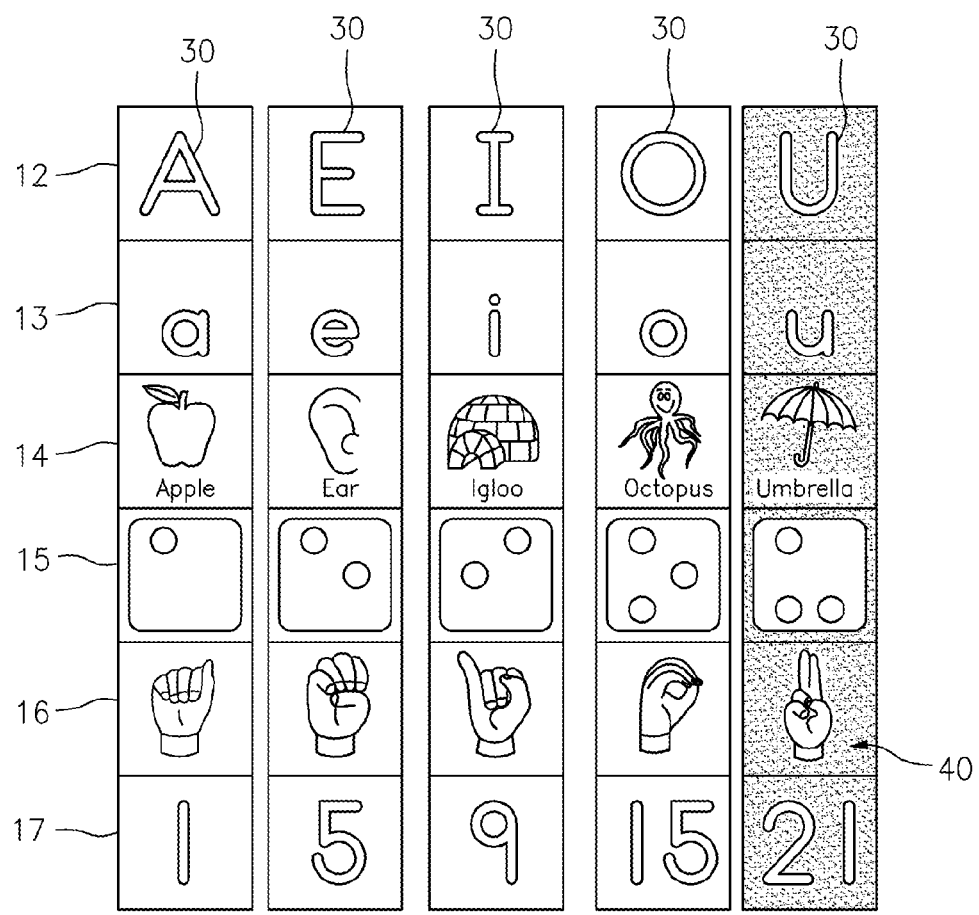
FIG. 3 is a plan view of several language letter families, in accordance with another embodiment of the invention.
Figure 4:
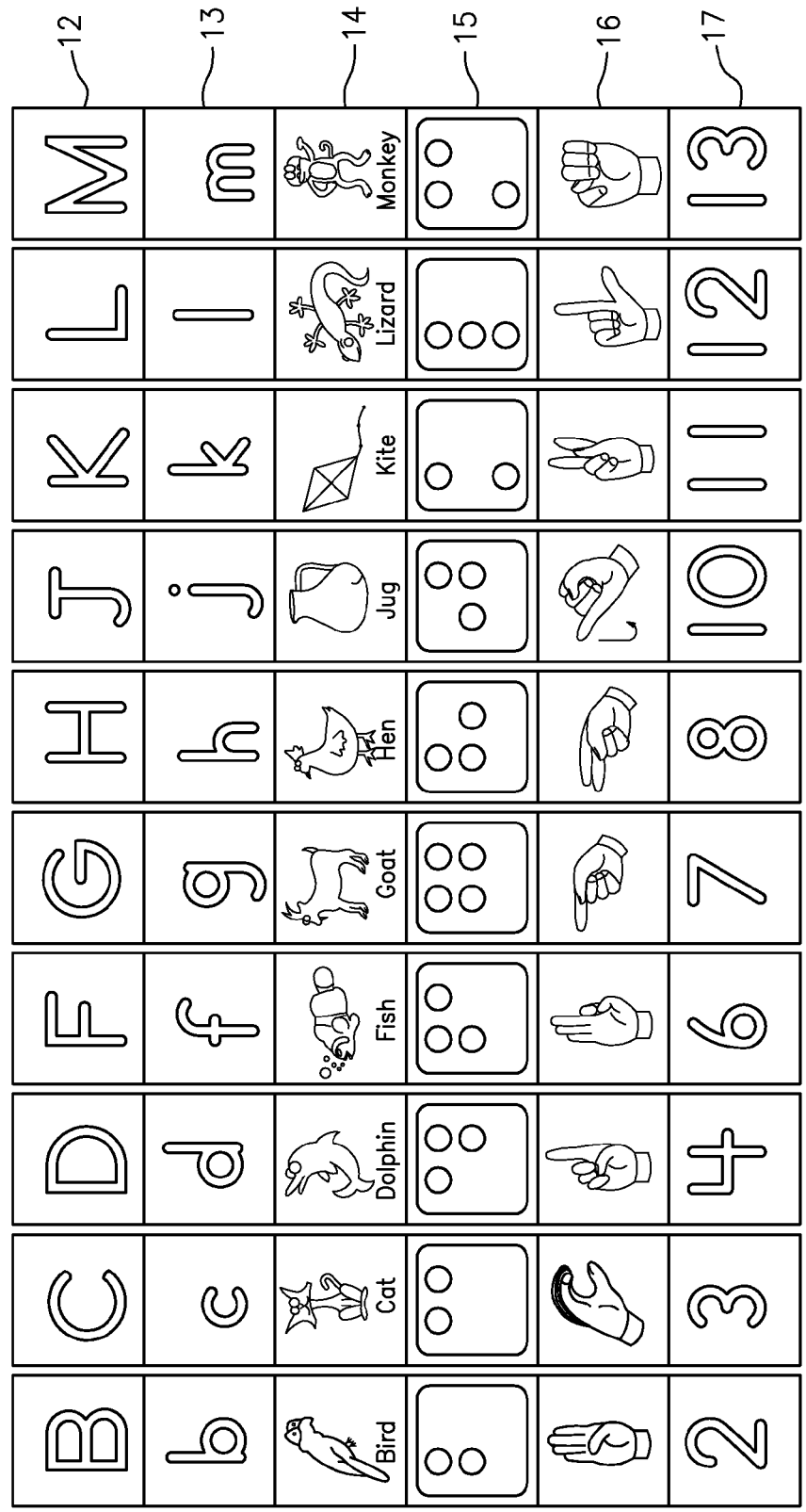
FIG. 4 is a plan view of several other language letter families, in accordance with another embodiment of the invention.
Figure 5:
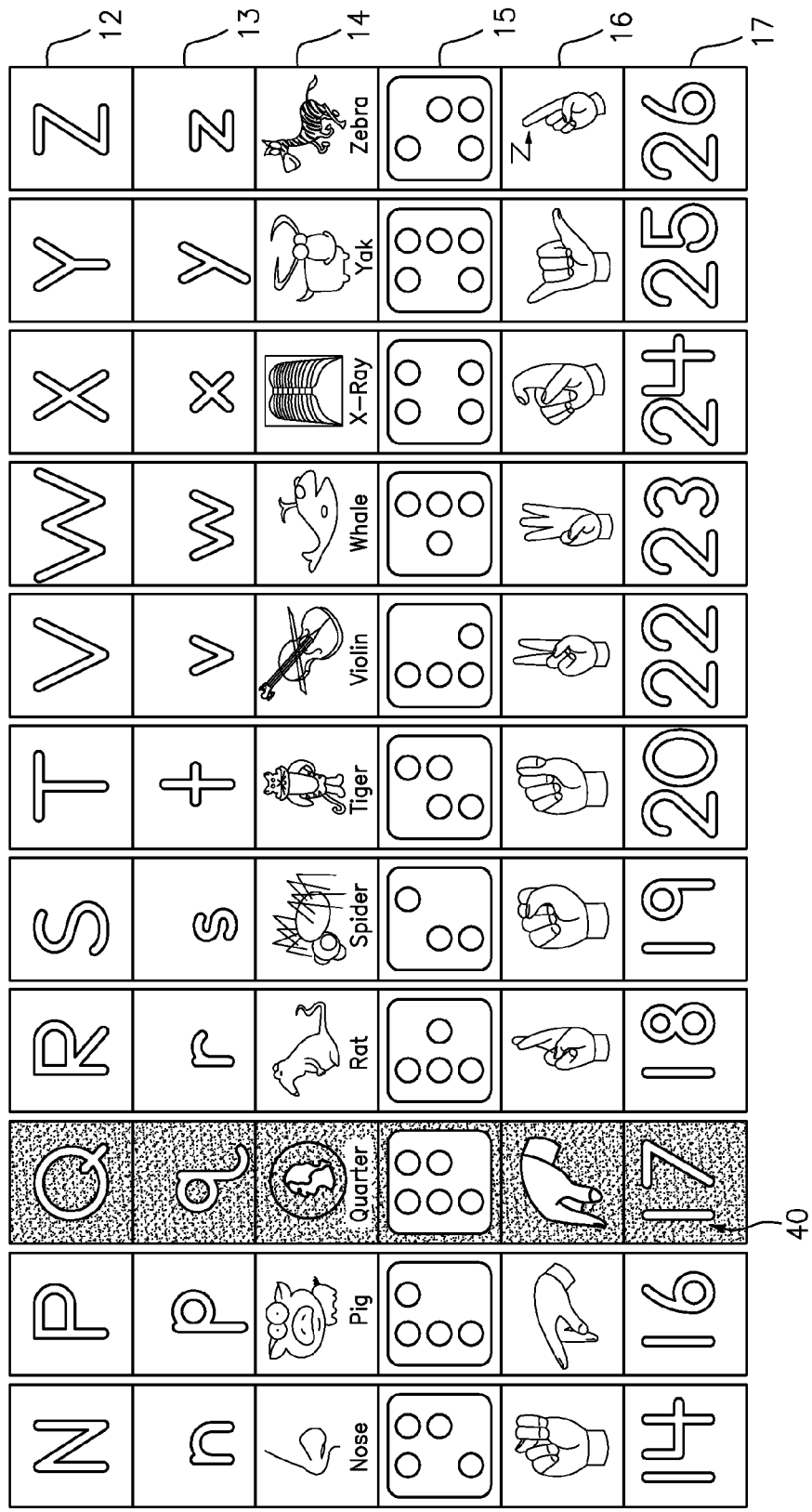
FIG. 5 is a plan view of several other language letter families, in accordance with another embodiment of the invention.

Although shown in FIGS. 1 and 2 as including the letter combination of A, B, C and D, in a single totem, this is for illustrative purposes only. In this regard, the totem 10 can include any combination of letters ranging from A-Z, as shown in FIGS. 3-5. As such, the invention is not limited to any particular arrangement of letters on a single totem. Moreover, although illustrated as including a particular word and image combination, this is also for illustrative purposes only, as each letter can include any number of different word and image combinations. For example, the letter A can include the illustrated "Apple" 14, but could also include other word and image combinations such as "Airplane," "Alligator," "Ant," etcetera.

Figure 6:
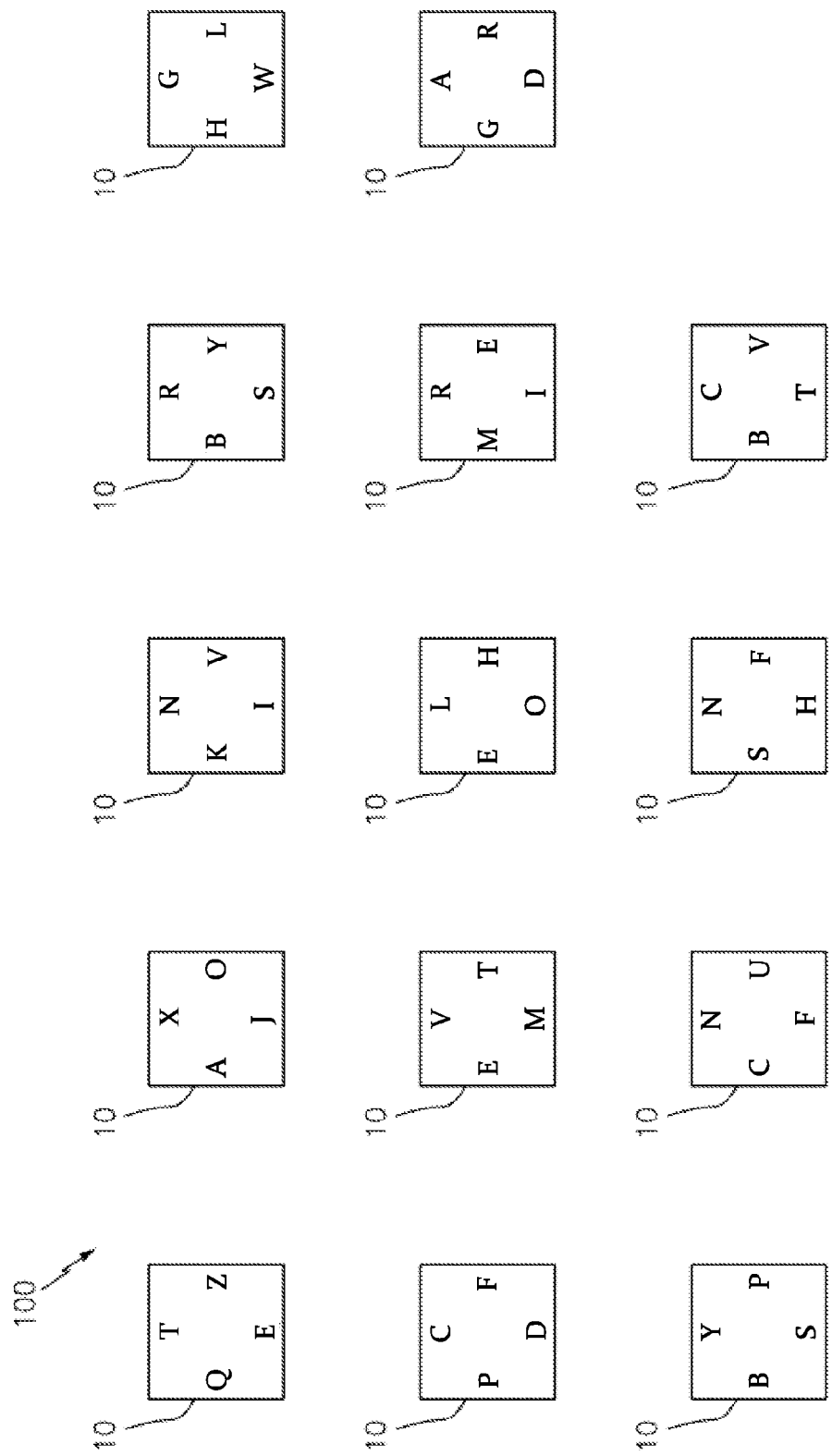
FIG. 6 is a simplified top view of a set of spelling totems, in accordance with one embodiment of the invention.
Figure 7:
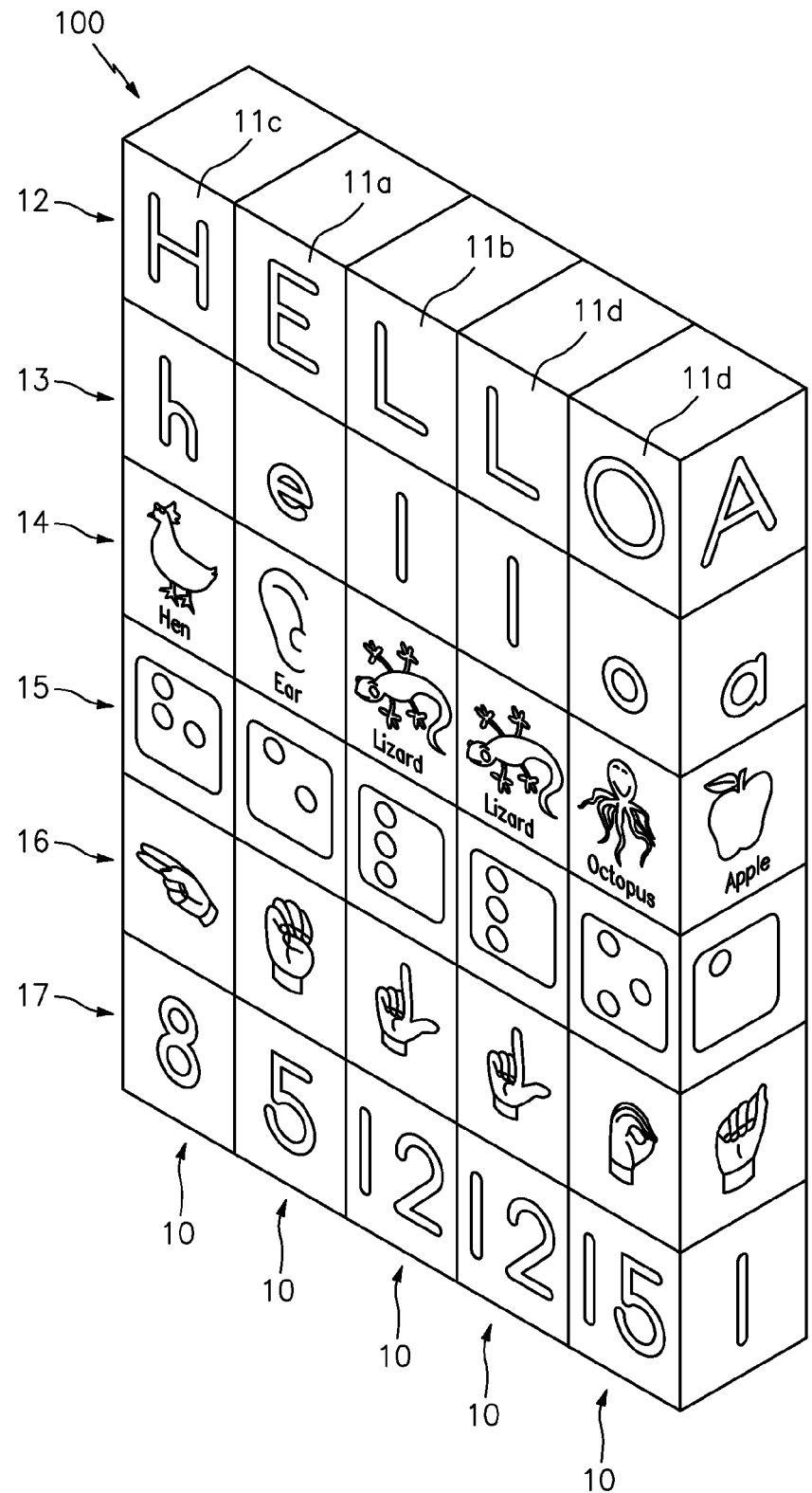
FIG. 7 is a perspective view of several spelling totems arranged to spell a word, in accordance with one embodiment of the invention.

FIG. 6 illustrates one embodiment of a set 100 that comprises 14 individual totems 10, each having four different letter family combinations. As shown several different totems can include duplicate letters in order to spell a variety of different words. In this regard, and as described above, each individual totem 10 is designed to be aligned and/or stacked in any combination to form individual words. As such, FIG. 7 illustrates one embodiment of the set 100 wherein the side surfaces 11a-11d of five individual totems 10 are aligned to spell the word "Hello". Of course, any number of other words can also be created through the use of additional totems.

Although described and illustrated as including a particular number of totems and a particular letter combination, this is for illustrative purposes only, as any number of other combinations are also contemplated. For example, another embodiment of the invention contemplates the arrangement and construction of the set 100 in accordance with a mathematical formula so as to allow a relatively small number of individual totems to be aligned to spell thousands of different words. Although not illustrated, this embodiment may further include a solution key containing a series of numbers and/or symbols which are arranged along the top and bottom ends of each totem. The solution key can aid teachers in aligning and/or reviewing aligned totems to spell the desired words.

FIGS. 8 and 9 illustrate an alternate embodiment of a totem 70 that includes a plurality of independently twisting block sections 71, 72, 73, 74, 75, and 76. As shown, each block can be rotatably secured to a centrally located shaft 81, and can function to twist (See arrow a) independent of each adjacent block. Each block can also contain elements 12-17 in a vertically stacked orientation, as described above. In operation, the totem 70 can function as an interactive game in which children must align each block 71-76 in a manner where the elements 12-17 are in their correct position, as illustrated above with respect to FIGS. 3-5. Such a feature provides an interactive experience for children to master the skills taught by the above described totem(s) 10. Although not specifically illustrated, it is further contemplated that the above described set could also contain one or more totems 70.

As described herein, the term "rotatably secured" describes a situation wherein two or more objects are joined together in a manner that allows one or both of the objects to rotate about or in relation to the other object. Securement of the blocks onto the central shaft can be performed in accordance with known manufacturing techniques, and can utilize any number of twisting connectors.

Therefore, the above described tactile spelling totem can function to teach children the basics of letters and spelling across multiple communication platforms, while facilitating a hands-on playing environment for children.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A spelling totem, comprising:
    an elongated, generally rectangular box-shaped member having a top end, a bottom end, a first side surface, a second side surface, a third side surface and a fourth side surface;
    a first letter language family that is disposed along the first side surface;
    a second letter language family that is disposed along the second side surface;
    a third letter language family that is disposed along the third side surface; and
    a fourth letter language family that is disposed along the fourth side surface,
    wherein the rectangular member includes a plurality of horizontal ridges that extend across each of the first, second, third and fourth side surfaces, said ridges functioning to create the appearance of a series of vertically aligned building blocks, and
    each of the first, second, third and fourth letter language families include a different single letter from an alphabet, and a plurality of letter implementations.

2. The totem of claim 1, wherein the plurality of letter implementations includes:
    an upper and lower case representation of the single letter.

3. The totem of claim 1, wherein the plurality of letter implementations includes:
    a word beginning with the single letter, and
    an image of the word.

4. The totem of claim 1, wherein the plurality of letter implementations includes:
    a braille representation of the single letter.

5. The totem of claim 1, wherein the plurality of letter implementations includes:
    a sign language representation of the single letter.

6. The totem of claim 1, wherein the plurality of letter implementations includes:
    a number representing a location of the single letter in the alphabet.

7. The totem of claim 1, wherein the ridges are interposed between each of the plurality of letter implementations on each of the first, second, third and fourth letter language families.

8. The totem of claim 1, wherein each of the plurality of letter implementations of each of the letter language families include at least one of a raised and recessed surface area, said area functioning to allow a user to physically feel a shape of the implementation.

9. The totem of claim 8, wherein the letter implementations of one or more of the letter language families includes a color that is different from a color of another letter implementations of another letter language family.

10. The totem of claim 8, wherein the letter implementations of one or more of the letter language families includes a material that is different from a material of another letter implementations of another letter language family.

11. The totem of claim 8, wherein the letter implementations of one or more of the letter language families includes a texture that is different from a texture of another letter implementations of another letter language family.

12. The totem of claim 1, wherein each letter family that is directed toward a vowel contains a color that is different from a color of each letter family that is directed toward a consonant.

13. The totem of claim 1, wherein each letter family that is directed toward a vowel contains a surface material that is different from a surface material of each letter family that is directed toward a consonant.

14. The totem of claim 1, wherein each letter family that is directed toward a vowel contains a surface texturing that is different from a surface texturing of each letter family that is directed toward a consonant.

15. The totem of claim 1, wherein the alphabet consists of the modern English alphabet, and includes the letters A through Z.

16. A set, comprising:
    a plurality of spelling totems, each of said totems including
        an elongated, generally rectangular box-shaped member having a top end, a bottom end, a first side surface, a second side surface, a third side surface and a fourth side surface,
        a first letter language family that is disposed along the first side surface,
        a second letter language family that is disposed along the second side surface,
        a third letter language family that is disposed along the third side surface, and
        a fourth letter language family that is disposed along the fourth side surface,
            wherein the rectangular member includes a plurality of horizontal ridges that extend across each of the first, second, third and fourth side surfaces, said ridges functioning to create the appearance of a series of vertically aligned building blocks, each of the first, second, third and fourth letter language families include a different single letter from an alphabet, and a plurality of letter implementations, and wherein the alphabet consists of the modern English alphabet, and at least one language letter family is directed to each of the letters A, B, C, D, E, F, G, H, I, J, K, L, M, N, O, P, Q, R, S, T, U, V, W, X, Y and Z.

17. The set of claim 16, wherein each of the spelling totems include a uniform shape, and are configured to be aligned to spell a plurality of different words.

18. The set of claim 16, wherein each letter family that is directed toward a vowel contains a color that is different from a color of each letter family that is directed toward a consonant.

19. The set of claim 16, wherein each letter family that is directed toward a vowel contains a surface texturing that is different from a surface texturing of each letter family that is directed toward a consonant.

\* \* \* \* \*